United States Patent
Weigert et al.

[19]

[11] Patent Number: 6,105,737
[45] Date of Patent: *Aug. 22, 2000

[54] PROGRAMMABLE ELECTRONIC PEDAL SIMULATOR

[75] Inventors: Thomas Weigert, Bad Soden; Salvatore Oliveri, Filsen; Robert L. Ferger, Homburg; Andrew W. Kingston, Heidesheim, all of Germany

[73] Assignee: Varity Kelsey-Hayes GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/868,522

[22] Filed: Jun. 4, 1997

Related U.S. Application Data

[60] Provisional application No. 60/019,381, Jun. 5, 1996.

[51] Int. Cl.$^7$ .................................. B60L 7/00; B60T 8/34
[52] U.S. Cl. .............................. 188/158; 188/156; 303/3; 303/15; 303/20; 303/113.4
[58] Field of Search ..................................... 188/158, 162, 188/156; 303/3, 15, 20, 113.4, 155, 158, DIG. 3; 74/478

[56] References Cited

U.S. PATENT DOCUMENTS

| | | | |
|---|---|---|---|
| 4,395,883 | 8/1983 | Melinat | 60/545 |
| 4,576,417 | 3/1986 | Dobner | 303/15 |
| 4,602,702 | 7/1986 | Ohta et al. | 188/72.1 |
| 4,620,750 | 11/1986 | Leiber | 303/113.4 |
| 4,633,757 | 1/1987 | Kubota | 303/114.3 |
| 4,653,815 | 3/1987 | Agarwal et al. | |

(List continued on next page.)

FOREIGN PATENT DOCUMENTS

| | | |
|---|---|---|
| 0 242 521 B1 | 10/1988 | European Pat. Off. . |
| 0 238 921 B1 | 10/1989 | European Pat. Off. . |
| 0 296 376 B1 | 7/1991 | European Pat. Off. . |
| 0 319 750 B1 | 8/1991 | European Pat. Off. . |
| 0636 218 B1 | 10/1993 | European Pat. Off. . |

(List continued on next page.)

OTHER PUBLICATIONS

Article (ATZ Automobil Technische Zeitschrift, Jun. 1996, pp. 328–333) "Konzept für elektromechanische Fahrzeugbremse" (no translation).
Brochure ("Wittenstein Motion Control GmbH") publication date prior to May 1996. (no translation).
Article (Design Engineering, Jun. 1995, p. 13) "Germans get down to the nuts and bolts of motion control".
Brochure ("INA Lineartechnik", p. 10) publication date unknown (no translation).
Brochure: Deutsche Forschungsanstalt für Luft–und Raumfahrt e.V. (DLR)—Institute for Robotics and System Dynamics "Artificial muscle® and 'programmable spring' based on DLR's planetary roller screw drive", publication date prior to May 1996.

(List continued on next page.)

*Primary Examiner*—Peter M. Poon
*Assistant Examiner*—Thomas Williams
*Attorney, Agent, or Firm*—MacMillan, Sobanski & Todd, LLC

[57] ABSTRACT

A pedal simulator for a vehicle braking system. The pedal simulator is coupled to a brake pedal, and includes an electrical actuator operatively coupled to the brake pedal to selectively exert a force on the brake pedal. A position sensor is provided for generating a position signal indicative of the position of the brake pedal. A force sensor is provided for generating a force signal indicative of the force exerted upon the brake pedal by a driver. An electronic control unit is provided which has programmed therein a desired relationship between the position signal and the force signal. The electronic control unit determines an actual relationship between the position signal and the force signal and compares the actual relationship thus determined with the desired relationship. The electronic control unit controls the electrical actuator to selectively exert a force on the brake pedal to conform the actual relationship to the desired relationship.

24 Claims, 2 Drawing Sheets

U.S. PATENT DOCUMENTS

| | | | |
|---|---|---|---|
| 4,658,939 | 4/1987 | Kircher et al. | 188/156 |
| 4,730,877 | 3/1988 | Seibert et al. | 303/52 |
| 4,756,391 | 7/1988 | Agarwal et al. | 188/106.8 |
| 4,784,442 | 11/1988 | Petersen | 303/15 |
| 4,818,036 | 4/1989 | Reinecke | 303/50 |
| 4,826,255 | 5/1989 | Volz | 303/10 |
| 4,828,332 | 5/1989 | Lohberg | 303/113.3 |
| 4,850,457 | 7/1989 | Taig | 188/156 X |
| 4,850,459 | 7/1989 | Johannesen et al. | 188/156 |
| 4,858,436 | 8/1989 | Brusasco | 60/545 |
| 4,865,165 | 9/1989 | Taig | 188/156 |
| 4,895,227 | 1/1990 | Grenier et al. | 188/173 |
| 4,914,917 | 4/1990 | Schonlau | 303/113.4 |
| 4,918,921 | 4/1990 | Leigh-Monstevens et al. | 60/545 |
| 4,926,708 | 5/1990 | Dietrich et al. | 74/424.8 R |
| 4,928,543 | 5/1990 | Johannesen et al. | 188/156 X |
| 5,000,523 | 3/1991 | Mikhaeil-Boules et al. | 303/61 X |
| 5,094,079 | 3/1992 | Leigh-Monstevens et al. | 60/545 |
| 5,362,138 | 11/1994 | Clemens et al. | 303/50 |
| 5,468,058 | 11/1995 | Linkner, Jr. | 303/115.2 |
| 5,484,193 | 1/1996 | Fuller et al. | 303/113.1 |
| 5,658,055 | 8/1997 | Dieringer et al. | 303/114.3 |
| 5,762,407 | 6/1998 | Stacey et al. | 303/3 |
| 5,941,608 | 8/1999 | Campau et al. | 303/113.4 |

FOREIGN PATENT DOCUMENTS

| | | |
|---|---|---|
| 121043 | of 1899 | Germany. |
| 36 05 616 A1 | 8/1987 | Germany. |
| 36 11 251 A1 | 10/1987 | Germany. |
| 36 34 894 A1 | 12/1987 | Germany. |
| 36 41 656 C3 | 6/1988 | Germany. |
| 37 10 444 A1 | 10/1988 | Germany. |
| 3735315A1 | 4/1989 | Germany. |
| 37 39 684 A1 | 6/1989 | Germany. |
| 39 08 225 A1 | 9/1990 | Germany. |
| 40 24 257 A1 | 2/1992 | Germany. |
| 43 18 334 A1 | 12/1994 | Germany. |
| 195 11 287 A1 | 1/1996 | Germany. |
| 195 43 098 A1 | 12/1996 | Germany. |
| 195 43 098 C2 | 12/1996 | Germany. |
| 19540705A1 | 5/1997 | Germany. |
| WO 96/03301 | 2/1996 | WIPO. |

OTHER PUBLICATIONS

Schenk, D.E.; Wells, R.L.; Miller, J.E.: Intelligent Braking for Current and Future Vehicles, Society of Automotive Engineers (SAE) Technical Paper 950762, Feb. 27, 1995.

Bill, K.; Grundsatzuntersuchungen zum Einsatz elektrischer Radbremsen in Personenkraftfahrzeugen, Fortschr.–Ber, VDI Reihe 12 Nr. 166, VDI Verlag, 1992 (no translation).

Mitshcke, M.; Braun, H.; Czinczel, A.; Goktan, A.; Syta, S.: Antropotechnische Optimierung von PKW–Bremsen, Teil 1, Bosch Technn. Berichte 8, pp. 265–276. 1986/87 (no translation).

Ehlers, K.: Stellglieder in der Kraftfahrzeugtechnik, ETC–Fachbericht 22, VDE–Verlag, pp. 151–174, 1988 (no translation).

Bohm, J.: Kraft–und Positionsregelung von Industrierobotern mit Hilfe von Motorsignalen, Fortschr.–Ber, VDI Reihe 8 Nr. 405, VDI–Verlag, 1994. (no translation).

Wells, R.L.; Miller, J.E.: Electric Brake System for Passenger Vehicles—Ready for production, ISATA, Paper 93 ME 115, Aachen, pp. 349–356, 1993.

PROGRAMMABLE ELECTRONIC PEDAL SIMULATOR

This appln claims the benefit of U.S. Provisional No. 60/019,381 filed Jun. 5, 1996.

BACKGROUND OF THE INVENTION

This invention relates in general to vehicle brake systems and in particular to a pedal simulator for a vehicle brake-by-wire system.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic, pneumatic, or electrical mechanisms when an operator of the vehicle depresses a brake pedal. The structures of these drum brake assemblies and disc brake assemblies, as well as the actuators therefor, are well known in the art.

Typical conventional light vehicle brake systems are hydraulic, by which is meant that the brake pedal actuates a master cylinder, which in turn provides pressurized hydraulic fluid to actuate the brake assemblies. A hydraulic or vacuum booster may be provided to assist the brake pedal in actuating the master cylinder, but the braking demanded by the driver is conveyed to actuate the brake assemblies as mechanical forces and pressures.

In contrast, some brake systems are known in the art generally as brake-by-wire systems, by which is meant that at some point between the brake pedal and the brake assemblies at the wheels of the vehicle, the brake demand is conveyed as an electrical brake demand signal. This brake demand signal is used to control the operation of an electrical actuator. The electrical actuator may directly move a mechanism to force the brake pads or brake shoes of the brake assemblies into contact with the corresponding rotating brake surface, or may operate a hydraulic pump to pump brake fluid to actuate the brake assemblies. This latter type of brake-by-wire system, in which the brake demand is transmitted electrically to control a hydraulic pump, is also variously known as electro-hydraulic braking, electro-hydraulic control, or electronic brake management.

Typically, brake-by-wire systems are designed to make the driver interface with the brake system (the brake pedal) act similar to the brake pedal of a conventional hydraulic brake system in order to improve acceptance of brake by wire systems by consumers, and to avoid problems caused by drivers learning (or failing to learn) a new response during a braking situation. Thus, designers of brake-by-wire systems typically try to design a system in which the brake pedal will be easy to depress initially, but resist additional incremental depression of the brake pedal with ever increasing force, similar to a conventional hydraulic brake system.

One way that has been suggested to accomplish this mimicry of a conventional hydraulic brake system in a brake-by-wire system is to connect the brake pedal to a pedal travel simulator (referred herein as a pedal simulator) containing a spring which permits the brake pedal to be depressed against increasing force as the pedal is further depressed. Thus the pedal simulator enables the brake pedal to operate as if the pedal were connected to a conventional hydraulic brake system. The brake pedal may be directly connected to the spring by linkages, or, as is frequently the case in electro-hydraulic brake systems, the brake pedal can operate a master cylinder, the output of which is normally hydraulically directed to the pedal simulator. The brake demand signal is electrically generated as a function of the force exerted by the driver in moving the brake pedal to compress the spring, or as a function of the distance the brake pedal is depressed measured by a sensor, or as a function of both the force acting on the brake pedal and the distance the brake pedal is depressed.

SUMMARY OF THE INVENTION

One of the drawbacks of a pedal simulator which is based on a physical spring is that the characteristics of the pedal simulator can only be changed by physical modification of the pedal simulator, such as by changing out the spring used in the pedal simulator for a spring with a different spring rate or other physical characteristics. This drawback, which has been unappreciated until now, means that for a supplier to produce brake systems having different pedal feel characteristics for different models of cars, which may be desired by different manufacturers of automobiles, a variety of models of pedal simulators must be supplied, each having different characteristics.

To address this hitherto unappreciated problem, the novel pedal simulator of the present invention dispenses with the conventional spring of the prior art pedal simulator in favor of an electronic pedal simulator which can be programmed to mimic any desired spring characteristic. As the brake pedal is depressed to provide an input to the pedal simulator of the invention, the force versus displacement characteristics of the pedal simulator are monitored and compared to a pre-programmed set of characteristics. An electrical actuator is selectively actuated as required to assist or resist further incremental movement of the brake pedal, as required to cause the actual characteristics of the pedal simulator to match those of the pre-programmed characteristics. No physical changes need be made to the pedal simulator to change the response characteristics of the pedal simulator; the characteristics can be changed simply by changing the programmed characteristics. Thus the pedal simulator has a "programmable spring" characteristic which facilitates use of a single model of pedal simulator for many models of cars for which different pedal feels are desired.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
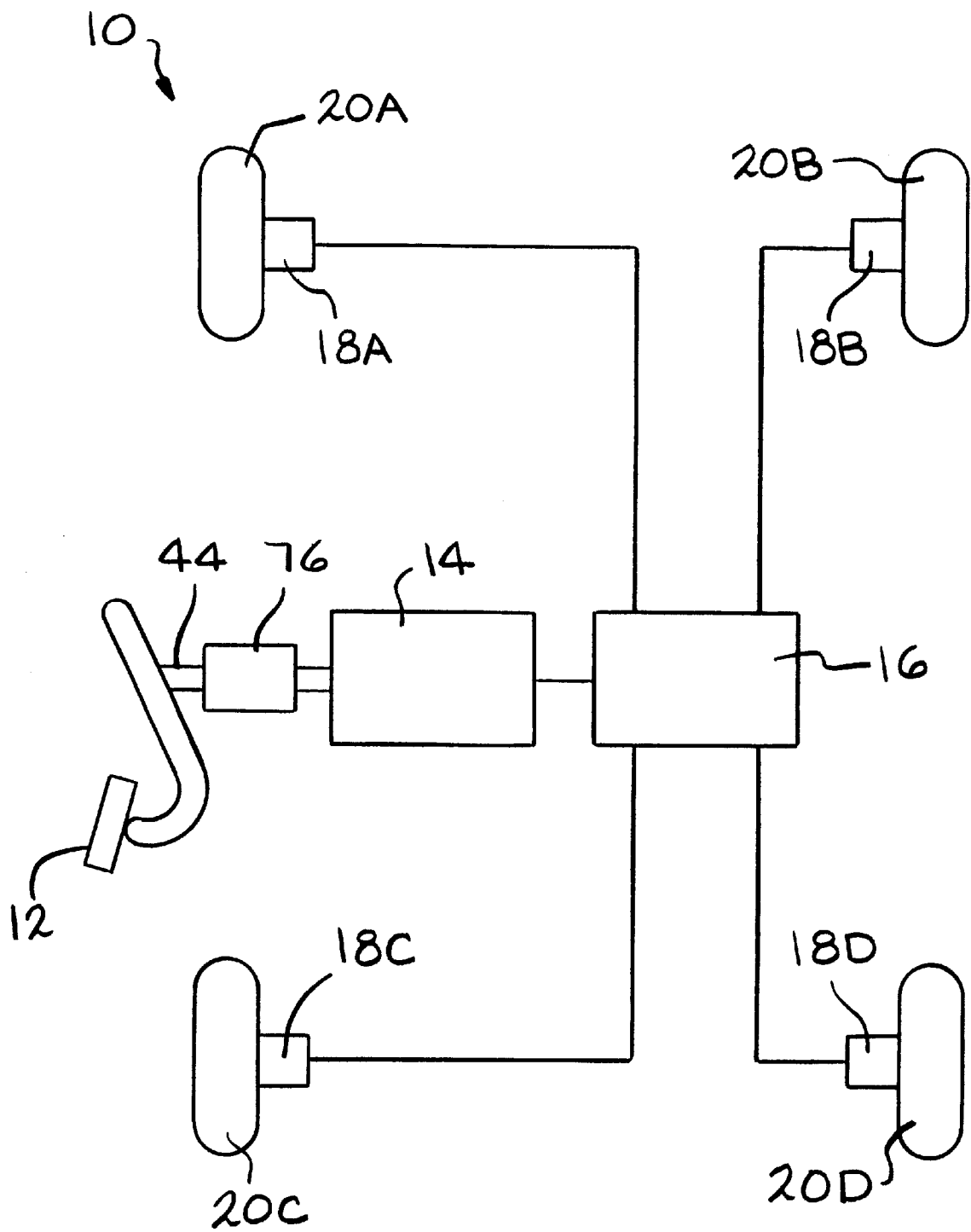
FIG. 1 is a schematic diagram of a brake-by-wire system including an electronic pedal simulator with a programmable spring in accordance with this invention.

Referring now to the drawings, there is illustrated in FIG. 1 a schematic diagram of a brake-by-wire system, indicated generally at 10, in accordance with this invention. The brake-by-wire system 10 includes a brake pedal 12, an electronic pedal simulator 14, an electronic control unit 16, and an electric brake unit 18A through 18D at each of the wheels 20A through 20D, respectively, of the vehicle. As will be discussed below, when an operator of the vehicle depresses the brake pedal 12 the electronic pedal simulator 14 is operative to provide feedback to the driver so that the brake pedal operates with a desired pedal feel, while brake demand is measured and a brake demand signal is sent to the electronic control unit 16. The electronic control unit 16 in turn generates signals to the brake units 18A through 18D to cause braking of the respective wheels 20A through 20D of the vehicle.

The electronic control unit 16 will preferably be enabled to individually control the braking units 18A through 18D to enable such advanced braking control schemes as anti-lock braking, traction control braking, braking for vehicle stability management, collision avoidance, hill holding, etc. Suitable sensors (not shown) to generate signals to the electronic control unit 16 to support such advanced braking control schemes would of course have to be provided. Sensors which are contemplated include sensors generating signals indicative of the speed of the individual wheels 20A through 20D, steering angle, vehicle yaw rate, collision avoidance radar, and the like.

It will be appreciated that, although the brake units 18A through 18D are described as electrically operated, the output of the electronic control unit 16 could instead be used to control the operation of a hydraulic pump (not shown) which could be used to supply hydraulically operated brake units (not shown) in place of the electrically operated brake units 18A through 18D. The electronic control unit 16 could also control the operation of valves (not shown) for controlling the pressure supplied from a single hydraulic pump to the individual brake units or control individual hydraulic pumps at each brake unit to enable the advanced braking control schemes described above.

Figure 2:
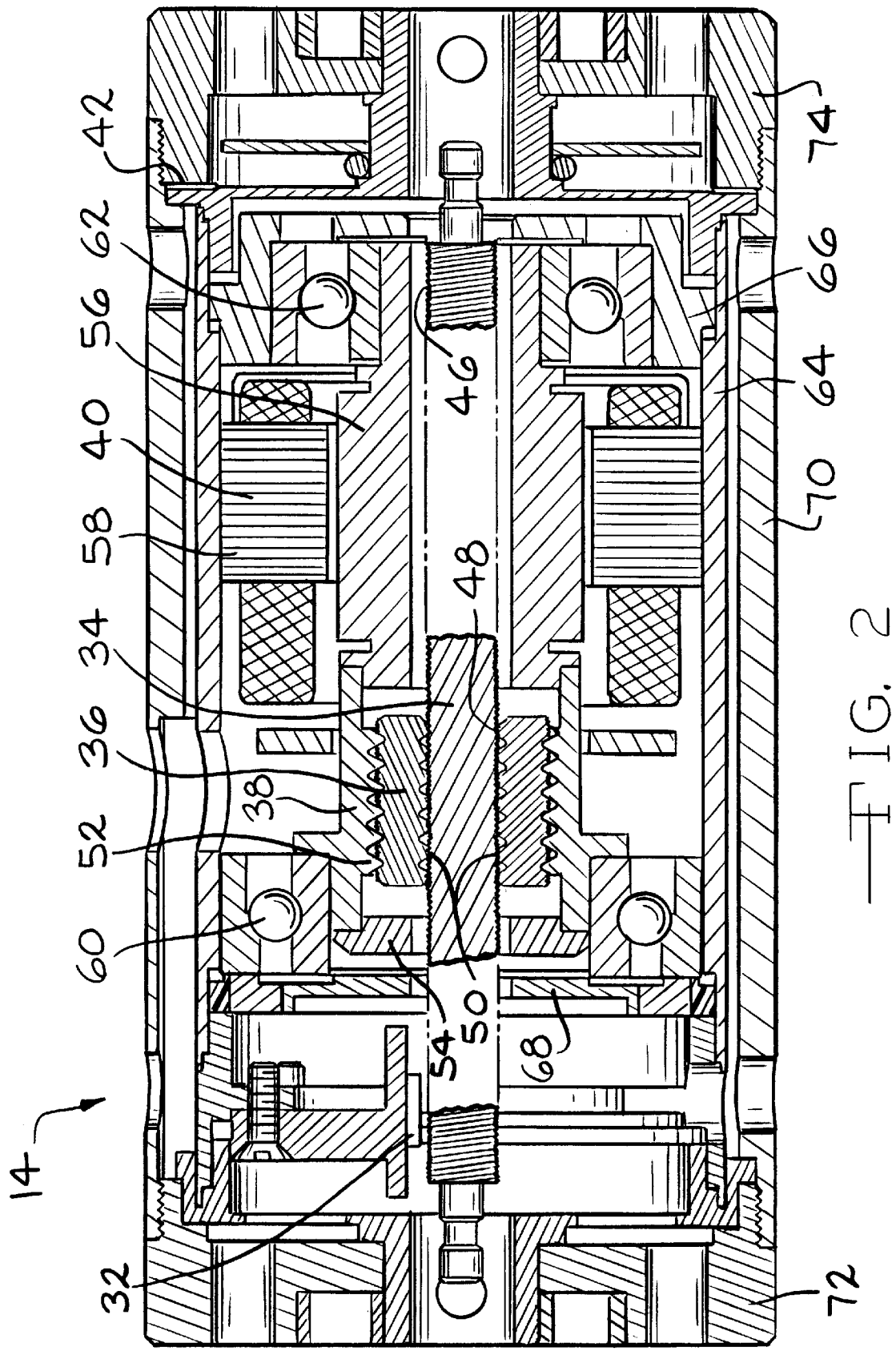
FIG. 2 is an enlarged view of the electronic pedal simulator illustrated in FIG. 1 according to a preferred embodiment of the invention.

Turning now to FIG. 2, the structure of a preferred embodiment of the electronic pedal simulator 14 will be discussed. As shown therein, the electronic pedal simulator 14 includes a position sensor 32, a spindle rod 34, a plurality of planetary rollers 36, a spindle nut or motor output shaft 38, an electric actuator embodied as a variable torque reversible electric motor 40, and a force sensor 42. The brake pedal 12 is operatively coupled to the electronic pedal simulator 14 via a brake pedal linkage 44. As will be discussed below, the position sensor 32 generates a signal to the electronic control unit 16 indicating the relative position of the spindle rod 34, and therefore, of the brake pedal 12, and the force sensor 42 generates a signal to the electronic control unit 16 indicating the pedal force applied by the vehicle operator. The signals from the position sensor 32 and the force sensor 42 are used to monitor the operation of the pedal simulator 14, and may be additionally used as indications of braking demand.

Preferably the spindle rod 34, the planetary rollers 36 and the spindle nut 38 form an apparatus similar to that disclosed in U.S. Pat. No. 4,926,708 to Dietrich et al., the disclosure of which is herein incorporated by reference. The spindle rod 34 is provided with relatively fine threads 46 on the outer surface thereof. The planetary rollers are spaced about the spindle rod 34, and rotate thereabout in a planetary fashion. Each of the planetary rollers 36 is provided with fine threads 48 which mesh with the threads 46 on the spindle rod 34, which have the same pitch. Each of the planetary rollers 36 is also provide with a coarse guide groove 50 which meshes with a coarse guide groove 52 of the same pitch on the interior of the spindle nut 38. The axial movement of the spindle rod 34 tends to cause rotation of the planetary rollers 36 and the spindle nut 38.

The spindle nut 38 supports a spindle nut cover 54 for rotation with the spindle nut 38. The spindle nut cover 54 protects the planetary rollers 36 from dust. The spindle nut 38 also supports the planetary rollers 36 for rotation therein, and through the planetary rollers 36, guides and supports the spindle rod 34. The spindle nut 38 is coupled for rotation with a rotor 56 of the motor 40. A pair of bearings 60 and 62 supports the spindle nut 38 and the rotor 56 for rotation relative to a stator 58 of the motor 40. The bearing 60 supports the spindle nut 38 relative to a tubular inner housing 64, while the bearing 62 supports the motor rotor 56 on an inner housing end cover 66. The inner housing end cover 66 is in turn supported on the inner housing 64. The inner housing end cover 66 serves to axially and radially support the bearing 62. A second inner housing end cover 68 serves to axially support the bearing 60, while the inner housing 64 acts to radially support the bearing 60. The inner housing is enclosed within a tubular outer housing 70 and a pair of opposed outer housing end covers 72 and 74. The outer housing end covers 72 and 74 support the inner housing 64 and fix the inner housing 64 against substantial movement relative to the outer housing 70 of the pedal simulator 14. The force sensor 42 is preferably mounted on the outer housing end cover 74 to measure the force exerted by the brake pedal linkage 44 on the pedal simulator 14. The force exerted by the brake pedal linkage 44 is transmitted through the spindle rod 34 to the planetary rollers 36, to the spindle nut 38, through the bearings 60 and 62 to the inner housing 64, and then on to the force sensor 42.

It will be appreciated that the locations of the position sensor 32 and the force sensor 42 may be other than as illustrated. For example, the position sensor 32 could be mounted to directly measure movement of the brake pedal 12, while the force sensor 42 could be located to directly measure forces existing in the brake pedal linkage 44.

When it is desired to actuate the electric brake units 18A through 18D to slow or stop the rotation of the respective wheels 20A through 20D of the vehicle, the operator of the vehicle depresses the brake pedal 12. The brake pedal 12 is operatively coupled to the spindle rod 34 via the brake pedal linkage 44 (shown in FIG. 1) so that depression of the brake pedal 12 causes the spindle rod 34 to be axially moved to the right in FIG. 2. The spindle rod 34 is constrained against rotation by any suitable means, such as through the coupling (not shown) of the spindle rod 34 with the brake pedal linkage 44.

At the same time, axial movement of the spindle rod 34 is sensed by the position sensor 32. The position sensor 32 generates a signal to the electronic control unit 16 indicating the relative position of spindle rod 34, and thus of the brake pedal 12. Also, the force sensor 42 generates a signal to the electronic control unit 16 indicating the measured force of the brake pedal linkage 44 acting on the pedal simulator 14, which is proportional to the force exerted by the vehicle operator on the brake pedal 12. The electronic control unit 16 preferably combines the signals from the position sensor 32 and the force sensor 42 to determine a brake demand. The electronic control unit then sends a signal to each of the electric brake units 18A through 18D to slow or stop the respective wheels 20A through 20D of the vehicle according to the brake demand of the operator of the vehicle.

When the operator of the vehicle no longer depresses the brake pedal 12, the electronic control unit 16 senses that the force exerted is low in relation to the desired force for the position sensed by the position sensor 32. The electronic control unit 16 energizes the electric motor 40, which rotates the spindle nut 38 and planetary rollers 36 to cause the spindle rod 34 to axially move to the left in FIG. 2 as if to raise the force sensed by the force sensor 42. Since the driver of the vehicle has released the brake pedal 12, the motor 40 drives the spindle rod 34 and the brake pedal 12 to a normal, unactuated position. At the same time, the electronic control unit 16 generates a signal to each of the electric brake units 18A through 18D to move them to a non-actuated position, thus allowing free rotation of the respective wheels 20A through 20D of the vehicle.

The electric motor 40 of the electronic pedal simulator 14 can be an "active" or a "passive" motor. In an electronic pedal simulator 14 having an active electric motor 40, the pitch of respective threads of the spindle rod 34 and planetary rollers 36 is relatively low such that the threads are "self-locking". With self-locking threads, an axial force exerted on the spindle rod 34 will not generate sufficient torque through the interaction of the threads of the spindle rod 34 and the planetary rollers 36 to overcome the friction therebetween, neither the planetary rollers 36 nor the spindle nut 38 will rotate. However, the force exerted on the spindle rod 34 will be transmitted to the force sensor 42. The force signal generated by the force sensor 42 is fed to the electronic control unit 16, where the force signal is compared to the position signal generated by the position sensor 32, and the relationship between the two signals is compared to a pre-programmed desired relationship stored in the electronic control unit 16. The desired relationship between force and position may be, for example, stored in a look-up table within the electronic control unit 16, or, as another example, may be dynamically calculated according to rules programmed into the electronic control unit 16. Typically, the desired relationship between force and position will be that when the brake pedal 12 is first depressed, little resistance to motion is desired. With self-locking threads provided in the pedal simulator, whether on the spindle rod 34 as described above, or on the spindle nut 38, the force exerted by the operator of the vehicle on the brake pedal will not initially result in movement of the spindle rod 34. Thus, a deviation from the desired relationship of low force for initial movement programmed into the electronic control unit 16 will be noted by the electronic control unit 16. In response, the electric motor 40 is energized by the electronic control unit 16 to turn in a direction which assists the brake pedal 12 in moving the spindle rod 34 as required to ensure the desired brake pedal movement has been achieved for the measured force. Thus, such a pedal simulator 14 would be an "active" pedal simulator, requiring the motor 40 to be energized to permit movement of the brake pedal.

In contrast, in a "passive" electronic pedal simulator 14, the pitch of the respective threads of the spindle rod 34 and the planetary rollers 36 is relatively high, and not self-locking. In such a passive electronic pedal simulator, the brake pedal 12 may be depressed and move the spindle rod 34 without energizing the electric motor 40. However, during movement of the spindle rod 34, the relationship between the force measured by the force sensor 42 and the position measured by the position sensor 32 is continuously monitored by the electronic control unit 16. If the relationship between force and position deviates from that programmed into the electronic control unit 16, the motor 40 is energized in order to act as a retarder with respect to the axial movement of the spindle rod 34 (if the force measured is low with respect to the desired force for the measured position), or to assist in the movement of the spindle rod 34 (if the force measured is high with respect to the desired force for the measured position).

In "panic" braking applications or when the brake pedal 12 is depressed relatively fast, a passive electronic pedal simulator 14 may be preferable since it is believed that such an electronic pedal simulator can better handle the dynamic action of the associated components thereof. Additionally, such a passive electronic pedal simulator 14 can relatively easily be coupled (for example at the right hand end of the spindle rod 34 as viewed in FIG. 2) to a backup means of braking (not shown), such as a master cylinder of a backup hydraulic braking circuit.

If desired, such as when an active pedal simulator 14 is to be used, or if needed to improve the response of a passive pedal simulator 14, an optional spring/damper 76 can be provided between the brake pedal 12 and the electronic pedal simulator 14, as shown in FIG. 1. The spring/damper 76 provides a spring loaded lost motion in the brake pedal linkage which permits an initial low force movement of the brake pedal before the motor 40 is energized to the desired torque, thus reducing potential problems with the response time of the electronic pedal simulator 14 during application of the brake pedal 12, and especially during panic or fast brake pedal 12 applications. The position sensor 32 in such an arrangement will preferably be positioned to monitor the movement of the brake pedal 12 or the brake pedal linkage 44 between the brake pedal 12 and the spring/damper 76. Thus positioning the position sensor 32 will allow the electronic control unit 16 to respond to the changing position signal and energize the motor 40 before lost motion provided by the spring/damper 76 is taken up.

One advantage of this invention is that the electronic pedal simulator 14 provides active programmable pedal feel and travel characteristics to the vehicle operator when the brake pedal 12 is depressed. Also, the electronic pedal simulator 14 provides a virtual "programmable spring" which does not require the use of a damping element to generate a "pleasant" pedal feel to the vehicle operator which is typically experienced by the vehicle operator when applying a conventional hydraulic braking system, especially during panic or fast brake pedal 12 applications. In addition, the programmable spring of the electronic pedal simulator 14 enables any desired force-travel characteristics to be provided including hysteresis and damping.

It should be noted that the pedal simulation of the present invention may be embodied as any suitable axial to rotary motion converter, such as a ball screw arrangement or other device, coupled to an electrical motor controlled as described above. Indeed, it is also contemplated that the pedal simulator of the present invention may be embodied as a variable force linear actuator coupled to the brake pedal to directly variably oppose movement of the brake pedal, and restore the brake pedal to an unactuated position, without the need for a linear to rotary motion conversion.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pedal simulator for a vehicle braking system comprising:

a brake pedal;

an electrical actuator operatively coupled to said brake pedal to selectively exert a force on said brake pedal;

a position sensor for generating a position signal indicative of the position of said brake pedal;

a force sensor for generating a force signal indicative of the force exerted upon said brake pedal by a driver; and an electronic control unit having programmed therein a desired relationship between said position signal and said force signal, said electronic control unit determining an actual relationship between said position signal and said force signal and comparing said actual relationship with said desired relationship and controlling said electrical actuator to selectively exert a force on said brake pedal to conform said actual relationship to said desired relationship, the electrical control unit developing a brake demand signal adapted to be supplied to a brake unit to cause the brake unit to supply all of a braking force.

2. The pedal simulator defined in claim 1 wherein said desired relationship between said force signal and said position signal generated at a position of said brake pedal differs during apply and release of said brake pedal to provide hysterisis.

3. A pedal simulator for a vehicle braking system comprising:

a brake pedal;

an electrical actuator operatively coupled to said brake pedal to selectively exert a force on said brake pedal, said electrical actuator including a rotary to linear motion converter for coupling an electric motor to said brake pedal;

a position sensor for generating a position signal indicative of the position of said brake pedal;

a force sensor for generating a force signal indicative of the force exerted upon said brake pedal by a driver; and an electronic control unit having programmed therein a desired relationship between said position signal and said force signal, said electronic control unit determining an actual relationship between said position signal and said force signal and comparing said actual relationship with said desired relationship and controlling said electrical actuator to selectively exert a force on said brake pedal to conform said actual relationship to said desired relationship, the electrical control unit developing a brake demand signal adapted to be supplied to a brake unit to cause the brake unit to supply all of a braking force.

4. The pedal simulator defined in claim 3 wherein said rotary to linear motion converter includes a spindle having threads formed thereon, a spindle nut having threads formed on an inner surface thereof and a plurality of planetary rollers engaging said threads of said spindle and said threads of said spindle nut for operatively coupling said spindle and said spindle nut, said spindle being coupled to said brake pedal to move axially with movement of said brake pedal, said spindle nut being operatively coupled to the rotary output of said electric motor.

5. The pedal simulator defined in claim 3 wherein said electric actuator is an "active" actuator.

6. The pedal simulator defined in claim 3 wherein said electric actuator is a "passive" actuator.

7. A pedal simulator for a vehicle braking system comprising:

a brake pedal;

an electrical actuator operatively coupled to said brake pedal to selectively exert a force on said brake pedal, said electrical actuator including a rotary to linear motion converter for coupling an electric motor to said brake pedal, said rotary to linear motion converter includes a spindle having threads formed thereon, a spindle nut having threads formed on an inner surface thereof and a plurality of planetary rollers engaging said threads of said spindle and said threads of said spindle nut for operatively coupling said spindle and said spindle nut, said spindle being coupled to said brake pedal to move axially with movement of said brake pedal, said spindle nut being operatively coupled to the rotary output of said electric motor, one of said threads on said spindle and said threads on said spindle nut being self-locking;

a position sensor for generating a position signal indicative of the position of said brake pedal;

a force sensor for generating a force signal indicative of the force exerted upon said brake pedal by a driver; and an electronic control unit having programmed therein a desired relationship between said position signal and said force signal, said electronic control unit determining an actual relationship between said position signal and said force signal and comparing said actual relationship with said desired relationship and controlling said electrical actuator to selectively exert a force on said brake pedal to conform said actual relationship to said desired relationship.

8. A pedal simulator for a vehicle braking system comprising:

a brake pedal;

an electrical actuator operatively coupled to said brake pedal to selectively exert a force on said brake pedal, said electrical actuator including a rotary to linear motion converter for coupling an electric motor to said brake pedal;

a position sensor for generating a position signal indicative of the position of said brake pedal;

a force sensor for generating a force signal indicative of the force exerted upon said brake pedal by a driver;

an electronic control unit having programmed therein a desired relationship between said position signal and said force signal, said electronic control unit determining an actual relationship between said position signal and said force signal and comparing said actual relationship with said desired relationship and controlling said electrical actuator to selectively exert a force on said brake pedal to conform said actual relationship to said desired relationship; and a spring/damper operatively disposed between said brake pedal and said electrical actuator for providing a spring-loaded lost motion between said brake pedal and said electrical actuator.

9. The pedal simulator defined in claim 8 wherein said position sensor monitors the position of a brake pedal linkage coupling said brake pedal to said spring/damper to develop said position signal indicative of said brake pedal position.

10. A pedal simulator for a vehicle braking system comprising:

a brake pedal;

an electrical actuator operatively coupled to said brake pedal to selectively exert a force on said brake pedal, said electrical actuator including a rotary to linear motion converter for coupling an electric motor to said brake pedal;

a position sensor for generating a position signal indicative of the position of said brake pedal;

a force sensor for generating a force signal indicative of the force exerted upon said brake pedal by a driver;

an electronic control unit having programmed therein a desired relationship between said position signal and said force signal, said electronic control unit determining an actual relationship between said position signal and said force signal and comparing said actual relationship with said desired relationship and controlling said electrical actuator to selectively exert a force on said brake pedal to conform said actual relationship to said desired relationship; and a structure adapted to couple said brake pedal to a standby braking system through said electric actuator.

11. An electronic pedal simulator for use in a brake system, said electronic pedal simulator comprising:

an input member which is selectively urged to movement by a driver of the vehicle;

means for determining a relationship between a position of said input member and a force with which said driver is urging movement of said input member;

programmable spring means for selectively assisting and resisting movement of said input member by the driver of the vehicle; and an electronic control unit for developing a brake demand signal adapted to be supplied to a brake unit to cause the brake unit to supply all of a braking force, said electronic control unit controlling operation of said programmable spring means according to a predetermined relationship of said position and said force.

12. The pedal simulator defined in claim 11 wherein said programmable spring means is an electrical actuator which includes a rotary to linear motion converter for coupling an electric motor having a rotary output to said input member.

13. The pedal simulator defined in claim 12 wherein said rotary to linear motion converter includes a spindle having threads formed thereon, a spindle nut having threads formed on an inner surface thereof and a plurality of planetary rollers engaging said threads of said spindle and said threads of said spindle nut for operatively coupling said spindle and said spindle nut, said spindle being coupled to said input member to move axially with movement of said input member, said spindle nut being operatively coupled to the rotary output of said electric motor.

14. The pedal simulator defined in claim 12 wherein said electric motor is a variable torque, reversible electric motor.

15. The pedal simulator defined in claim 11 wherein said spring means is an "active" electric actuator.

16. The pedal simulator defined in claim 11 wherein said spring means is a "passive" electric actuator.

17. The pedal simulator defined in claim 11 wherein said means for determining a relationship between a position of said input member and a force with which said driver is urging movement of said input member comprises a position sensor for generating a position signal indicative of the position of said input member and a force sensor for generating a force signal indicative of the force exerted upon said input member by a driver, and an electronic control unit controlling operation of said programmable spring means according to said predetermined relationship of location and force in response to said position signal and said force signal.

18. The pedal simulator defined in claim 11 wherein said position sensor monitors the position of an input member linkage coupling said input member to said programmable spring means to develop said position signal indicative of said input member position.

19. The pedal simulator defined in claim 11 wherein said predetermined relationship between location and force generated at a position of said input member differs depending on the direction of movement of said input member to provide hysterisis.

20. An electronic pedal simulator for use in a brake system, said electronic pedal simulator comprising:

an input member which is selectively urged to movement by a driver of the vehicle;

means for determining a relationship between a position of said input member and a force with which said driver is urging movement of said input member; and an electrical actuator for selectively assisting and resisting movement of said input member by the driver of the vehicle according to a predetermined relationship of location and force, said electrical actuator including a rotary to linear motion converter for coupling an electric motor having a rotary output to said input member, said rotary to linear motion converter including a spindle having threads formed thereon, a spindle nut having threads formed on an inner surface thereof and a plurality of planetary rollers engaging said threads of said spindle and said threads of said spindle nut for operatively coupling said spindle and said spindle nut, said spindle being coupled to said input member to move axially with movement of said input member, said spindle nut being operatively coupled to the rotary output of said electric motor, one of said threads on said spindle and said threads on said spindle nut being self-locking.

21. An electronic pedal simulator for use in a brake system, said electronic pedal simulator comprising:

an input member which is selectively urged to movement by a driver of the vehicle;

means for determining a relationship between a position of said input member and a force with which said driver is urging movement of said input member;

programmable spring means including a rotary to linear motion converter for coupling an electric motor having a rotary output to said input member for selectively assisting and resisting movement of said input member by the driver of the vehicle according to a predetermined relationship of said position and said force; and a spring/damper operatively disposed between said input member and said electrical actuator for providing a spring-loaded lost motion between said input member and said electrical actuator.

22. An electronic pedal simulator for use in a brake system, said electronic pedal simulator comprising:

an input member which is selectively urged to movement by a driver of the vehicle;

means for determining a relationship between a position of said input member and a force with which said driver is urging movement of said input member;

programmable spring means for selectively assisting and resisting movement of said input member by the driver of the vehicle;

an electronic control unit for developing a brake demand signal adapted to be supplied to a brake unit to cause the brake unit to supply all of a braking force, said electronic control unit controlling operation of said programmable spring means according to a predetermined relationship of said position and said force; and a structure adapted to couple said input member to a standby braking system through said programmable spring means.

23. A vehicle braking system comprising:

a brake unit selectively operable for braking a vehicle;

a brake pedal;

an electrical actuator operatively coupled to said brake pedal to selectively exert a force on said brake pedal;

a position sensor for generating a position signal indicative of the position of said brake pedal;

a force sensor for generating a force signal indicative of the force exerted upon said brake pedal by a driver; and an electronic control unit for generating braking signals for controlling the operation of the brake unit to supply all of the braking force for braking the vehicle and having programmed therein a desired relationship between said position signal and said force signal, said electronic control unit determining an actual relationship between said position signal and said force signal and comparing said actual relationship with said desired relationship and controlling said electrical actuator to selectively exert a force on said brake pedal to conform said actual relationship to said desired relationship independent of the braking signals and the operation of the brake unit.

24. The braking system defined in claim 23 wherein said desired relationship between said force signal and said position signal generated at a position of said brake pedal differs during apply and release of said brake pedal to provide hysterisis.

* * * * *